April 18, 1967     A. BETHUNE     3,314,171
TEACHING DEVICE

Filed Oct. 6, 1964     2 Sheets-Sheet 1

INVENTOR
ADE BETHUNE

BY *J. Allan Hobson*

ATTORNEY

United States Patent Office

3,314,171
Patented Apr. 18, 1967

3,314,171
TEACHING DEVICE
Ade Bethune, 118 Washington, St.,
Newport, R.I. 02840
Filed Oct. 6, 1964, Ser. No. 401,858
8 Claims. (Cl. 35—37)

This invention relates to a penmanship teaching device, eminently suited for the instruction of beginners.

The use of sandpaper letters to provide a sense of touch in addition to the usual visual sense has been employed over many years in familiarizing children with the formation of letters of the alphabet. Early work in this area was carried on by Dr. Maria Montessori, who received U.S. Patent No. 1,103,369 on July 14, 1914 relating to this subject matter.

It is among the objects of the present invention to carry forward this concept so as to provide the student with a tactile image of not only the strokes to form a letter or symbol which are ultimately visible, but in addition, to provide both a visual and tactile image of those motions which occur in the formation of such a symbol or letter which do not ordinarily appear in visual form. Such motions may be referred to as "air stroked." By instructing the student with respect to these air strokes as well as the visual strokes, the entire sequence of symbol or letter formation will become more readily evident, so that the student will become familiar with the preferred manner of producing such symbols or letters so as to achieve optimum legibility and speed.

A teaching device conforming with the present invention may comprise a block having a surface containing a groove defining at least one stroke of a legible symbol, and a projection extending above said surface adjacent an end of the groove corresponding with a motion made by a penman in forming the symbol of which the stroke is a portion. Ordinarily the surface will contain a plurality of grooves defining strokes of a legible symbol, and projections extending above the surface adjacent the ends of the grooves, corresponding with motions made by a penman at ends of the strokes.

Some of the grooves will have horizontal components and vertical components, whereas some will have only horizontal components and others only vertical components. In any case, those having larger vertical components will preferably have greater widths to accommodate the first two fingers of the hand of the student to better advantage, and at the same time simulate the line width produced by a blunt pen as it would be used in actually forming the visible strokes of a symbol or letter.

Some of the grooves will meet at intersections at which partitions are disposed to constitute signals or guides to assist the student to traverse the grooves in the preferred sequence. In connection with certain symbols and letters, the projections interconnect two of the grooves. In connection with some symbols and letters, a groove will lie between two such projections. In a preferred form of the invention, the symbol is a letter of the alphabet and the projections correspond to motions of a penman made between the visual strokes of a letter of the alphabet.

A more complete understanding of the invention will follow from a description of the accompanying drawings wherein.

Figure 1:
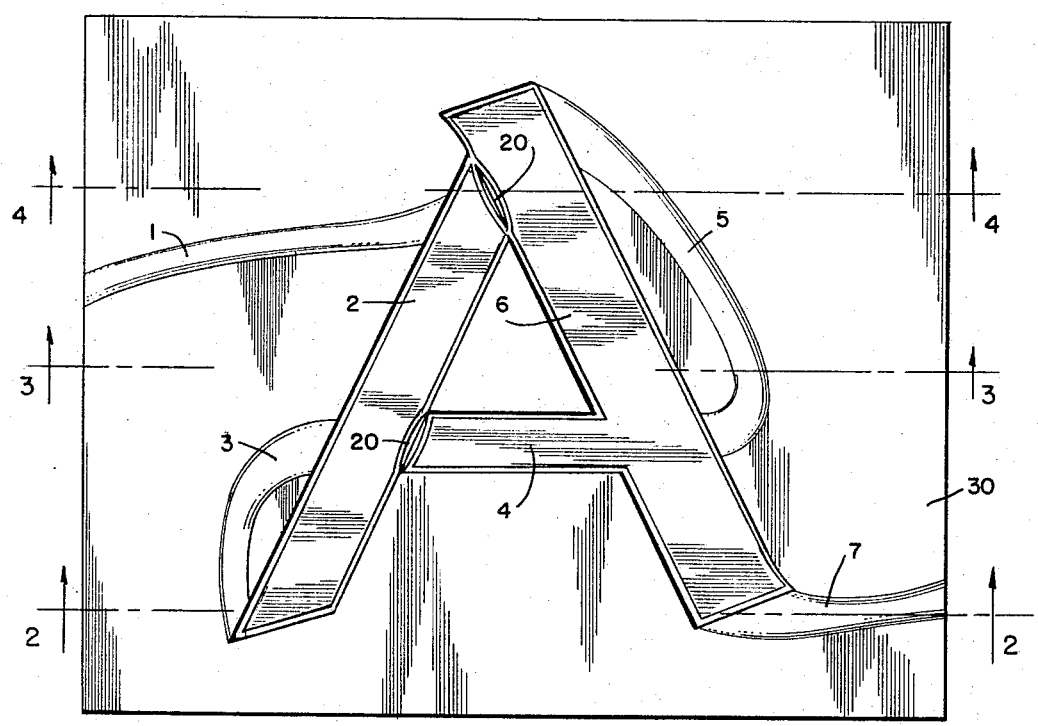
FIG. 1 is a plan view of a block exemplifying the present invention with respect to the letter "A"
Figure 2:
FIG. 2 is a sectional elevation taken along line 2—2 of FIG. 1.
Figure 3:
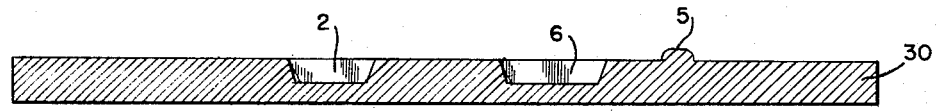
FIG. 3 is a sectional elevation taken along line 3—3 of FIG. 1.
Figure 4:
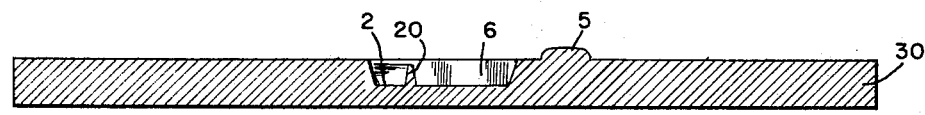
FIG. 4 is a sectional elevation taken along line 4—4 of FIG. 1.

As depicted in FIG. 1, the block 30 bears a representation of the letter "A" comprising grooves 2, 4 and 6 representing the strokes of the letter that are ordinarily visible and projections 1, 3, 5 and 7 representing the air strokes or motions of the penman which do not ordinarily appear on a writing surface. For purposes of clarification, throughout the drawings of the present application, these air strokes have been identified by odd numbers whereas the grooves representing the visual portions of the letters have been identified by even numbers. In addition, these numbers have been employed in such a way that the lowest number used with each letter will be the first stroke, subsequent numbers indicating subsequent strokes corresponding with the sequence of the numbers themselves. Where two grooves are adjacent one another, two consecutive numbers will be even numbers. Similarly, where two air strokes are adjacent one another, consecutive numbers will be odd numbers.

In connection with the letter "A" depicted in FIG. 1, it will be noted that the first stroke 1 is an air stroke, the second stroke 2 is a visual stroke defined by a groove, the third stroke 3 is an air stroke defined by a projection, the fourth stroke 4 is a visible stroke defined by a groove, the fifth stroke 5 is an air stroke defined by a projection, the sixth stroke 6 is a visible stroke defined by a groove, and the seventh stroke 7 is an air stroke defined by a projection.

At the intersection of the grooves 2 and 6 in FIG. 1, a partition 20 is formed so as to be engaged by the fingers of the student as they move from left to right along the projection 1 representing the air stroke. The presence of this partition will signify to the student that the previous air stroke should be terminated and a new stroke initiated. In other words, the student will soon learn that the fingers should not pass beyond the partition but should follow the path lying on the side of the partition from which it was approached. Accordingly, the fingers of the student will traverse the groove 2 representing the first visual stroke of the letter. The partition 20 of FIG. 1 occurring at the intersection of grooves 2 and 4 is an exception to this general construction, since the fingers of the student must pass over it in progressing from the projection 3 to the groove 4.

It will be observed that the horizontal groove 4 of FIG. 1 is somewhat narrower than the grooves 2 and 6 having substantial vertical components. This relationship will more readily accommodate the first two fingers of the student which are preferably used in tracing the grooves and projections constituting the strokes of the letter or symbol undergoing study.

Figure 5:
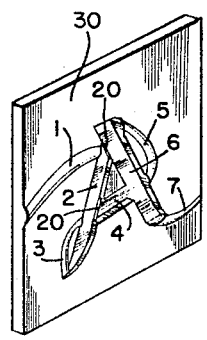
FIG. 5 is a perspective view of the block depicted in FIG. 1.
Figure 6:
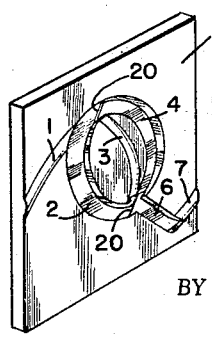
FIG. 6 is a somewhat similar perspective view of a block illustrating the invention with respect to the letter "Q"
Figure 7:
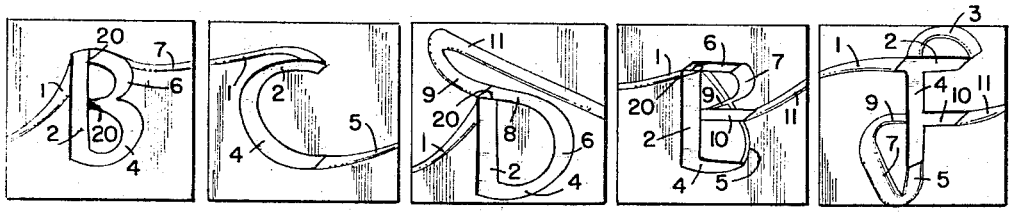
FIG. 7 is a plan view of blocks depicting the invention with respect to the letters B, C, D, E, and F.
Figure 8:
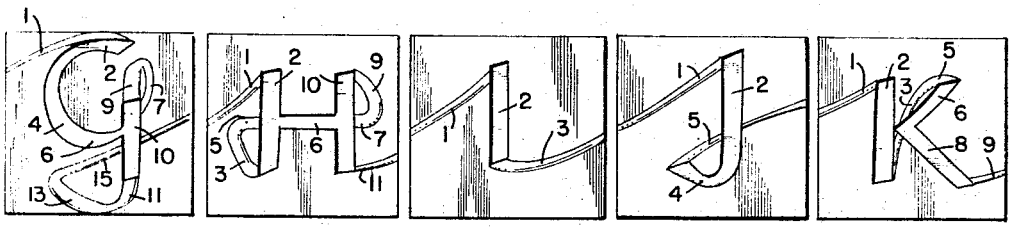
FIG. 8 is a plan view of blocks depicting the invention with respect to the lettters G, H, I, J, and K.
Figure 9:
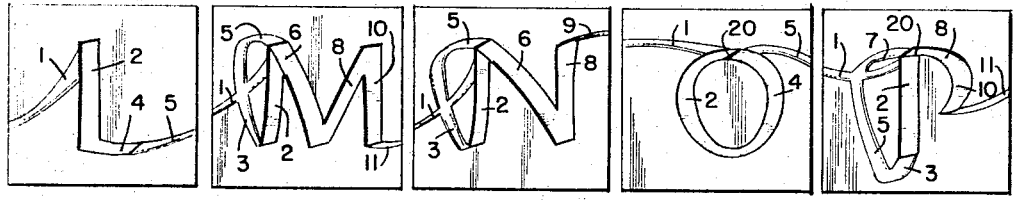
FIG. 9 is a plan view of blocks depicting the invention with respect to the letters L, M, N, O, P.
Figure 10:
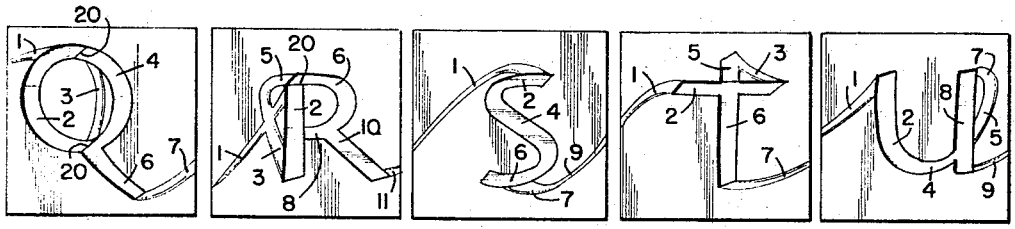
FIG. 10 is a plan view of blocks depicting the invention with respect to the letters Q, R, S, T and U.
Figure 11:
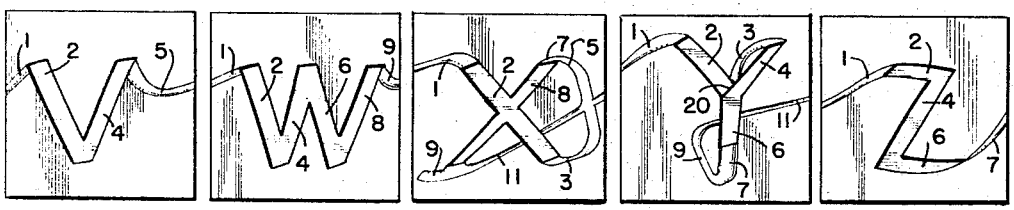
FIG. 11 is a plan view of blocks depicting the invention with respect to the letters V, W, X, Y and Z.

It is believed that the perspective views of FIGS. 5 and 6 providing a third dimensional effect will facilitate an appreciation of the invention. The letter "Q" has been depicted on the block 30 of FIG. 6 as made up of strokes 1, 2, 3, 4, 6 and 7. The visual strokes are defined by grooves 2, 4 and 6 whereas the air strokes which are not ordinarily visible in the completed letter are defined by the projections 1, 3 and 7. Partitions 20 are shown in two portions of the letter as guides or signals which will inform the student in which direction the strokes should proceed.

The letters of the alphabet from "B" through "Z" have been depicted in FIGS. 7, 8, 9, 10 and 11 wherein the projections on the blocks have been represented by odd numbers and the grooves by even numbers, as previously stated. The inventive concept is similarly present in connection with each of the letters of the alphabet whereby the student will receive instruction with respect to the invisible or air strokes as well as the visible or marking strokes produced by a penman in the construction of the symbols or letters involved. By utilizing the sense of touch along with the sense of vision, the student will necessarily receive a better image of the subject matter so as to facilitate learning, and improve performance with respect to legibility and speed.

Whereas only one set of letters has been employed for purposes of example, it will be clear that such variations are contemplated as fall within the scope of the accompanying claims.

I claim:

1. A penmanship teaching device comprising a block having a surface containing at least one groove defining a legible symbol, and an elongated projection extending above said surface adjacent to and directed towards an end of each said groove corresponding with a motion made by a penman beyond each groove in forming said symbol.

2. A penmanship teaching device comprising a block having a surface containing a plurality of grooves defining strokes of a legible symbol, and elongated projections extending above said surface adjacent to and directed towards the ends of said grooves corresponding with motions made by a penman at ends of said strokes.

3. A penmanship teaching device according to claim 2 wherein certain of said grooves have horizontal and vertical components respectively, those having larger vertical components than horizontal components having greater widths than those having larger horizontal components than vertical components.

4. A penmanship teaching device according to claim 2 wherein certain of said grooves meet at intersections, and partitions are disposed at certain of said intersections to serve as guides.

5. A penmanship teaching device comprising a block having a surface containing a plurality of grooves defining strokes of a legible symbol, and projections extending above said surface adjacent the ends of said grooves corresponding with motions made by a penman at ends of said strokes, at least one of said projections interconnecting two of said grooves.

6. A penmanship teaching device according to claim 2 wherein one of said grooves lies between two of said projections.

7. A penmanship teaching device according to claim 2 wherein said symbol is a letter of the alphabet.

8. A penmanship teaching device according to claim 2 wherein said projections correspond to motions of a penman between strokes of a letter of the alphabet.

References Cited by the Examiner

UNITED STATES PATENTS

| 716,629 | 12/1902 | Dodge | 35—37 |
| 1,103,369 | 7/1914 | Montessori | 35—71 |
| 2,068,497 | 1/1937 | Lorber | 35—37 |
| 2,277,329 | 3/1942 | Kimbrough | 35—37 |

FOREIGN PATENTS 713,991 11/1941 Germany.

EUGENE R. CAPOZIO, *Primary Examiner.*

W. GRIEB, *Assistant Examiner.*